March 19, 1935.  V. E. NELSON  1,994,830
OIL SEAL
Filed Dec. 28, 1932
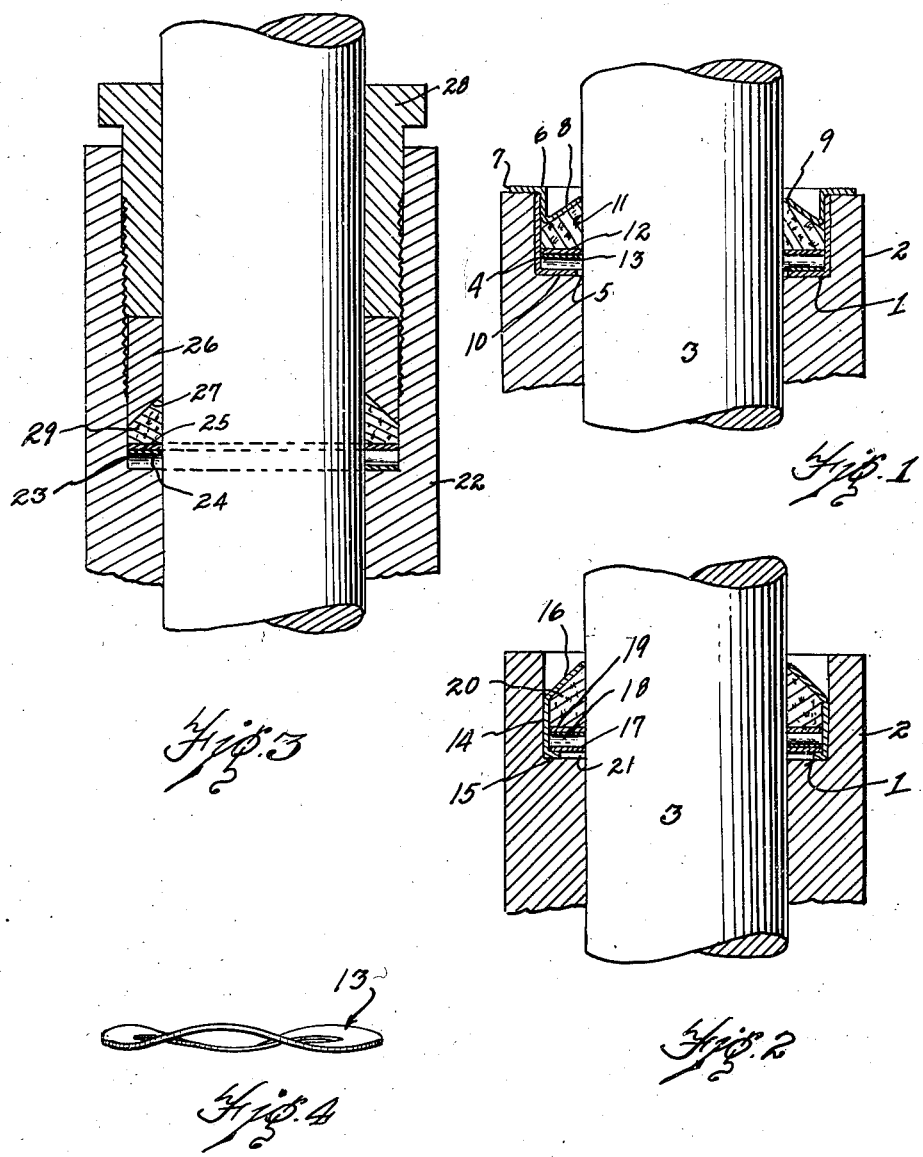
INVENTOR.
VICTOR E. NELSON
BY
ATTORNEY.

Patented Mar. 19, 1935

1,994,830

UNITED STATES PATENT OFFICE 1,994,830

OIL SEAL

Victor E. Nelson, Pontiac, Mich., assignor to Universal Oil-Seal Company, Pontiac, Mich., a corporation of Michigan Application December 28, 1932, Serial No. 649,177

2 Claims. (Cl. 286—5)

This invention relates to oil seals adapted to be positioned within a housing in encompassing relation to a rotatable shaft or the like to prevent grease, oil or other liquid from flowing through the housing or along the shaft to the exterior of the seal.

The principal object of the invention is to provide a spring pressed packing ring carried in a housing therefor and insertable as a unit in a shaft housing with the packing ring in pressure engagement with the shaft by reason of the spring pressure.

It is further an object of the invention to provide an oil seal having a compressible packing ring supported in a shaft housing and a spring means in conjunction with the ring to cause pressure engagement thereof with the shaft to compensate for wear, and an additional object is to provide a structure in which the packing ring is made serviceable for longer periods of time than is usual through the provision of means for repeatedly placing the packing under pressure engagement with the shaft subsequent to cessation of the functioning of the spring element provided for the purpose. Thus, after wear of the ring to such degree that the spring no longer may automatically compensate therefor, a manually operable means is provided to again by pressure cause engagement of the ring with the shaft and also again place the ring under tension to automatically function in maintaining pressure engagement between the ring and the shaft.

These and other objects and various novel features of construction of an oil seal embodying my invention are shown in the accompanying drawing in which—

Fig. 1 is a cross section of my improved oil seal showing the same in its assembled relation with the shaft and the housing or bearing for the shaft.

Fig. 2 is a similar section showing an alternative form of construction.

Fig. 3 is a section showing the form of the packing adapted for repeated manual takeup of wear of the ring in conjunction with a spring means to take up a certain degree of wear.

Fig. 4 is a perspective view of the preferred form of spring.

In the preferred form of construction shown in Fig. 1 the seal is set into an annular recess 1 in a housing or bearing 2 for a shaft 3 and the seal consists of an outer cup shaped member 4, L-shaped in cross section, the base of which is formed with an aperture 5 of greater diameter than the shaft and through which the shaft projects. An inner cup member 6 is provided for insertion in the outer cup member and the inner cup member 6 has a lateral flange 7 overlying the end of the cup member 4 and the end of the housing or bearing structure 2. This inner cup 6 has an outwardly coned portion 8 formed with a central aperture 9 through which the shaft extends, which cone like portion is spaced from the base 10 of the member 4 seating in the recess 1 of the housing 2.

Between this cone portion 8 and the base 10 of the member 4 is provided a compressible packing element 11, a flat washer 12 and a spring washer 13 of circular form and of what is known as the "wave" type. The spring washer 13 lies between the flat washer or plate 12 and the base 10 and tends to force the washer 12 toward the cone shaped portion 8 of the member 6 thus compressing the packing member 11 lying between the washer 12 and the cone portion 8. This spring washer tends to constantly maintain a pressure on the packing element and therefore tends to feed the member 12 toward the cone 8 which, due to its cone form, tends to force the packing inwardly toward the shaft to pressure contact therewith. The spring therefore automatically compensates for wear of the packing and insures the efficient functioning of the packing in prevention of the oil or grease passing from the bearing along the shaft surface to the exterior of the bearing and oil seal. The cup member 6 may be secured in the cup member 4 in any approved manner and the member 4 is a pressed fit in the chamber 1 of the housing whereby leakage along the wall of the recess is prevented.

By this construction the oil seal may be made for sale as a complete assembled unit which in assembling the same with the shaft and housing the packing ring is caused to tightly engage the shaft and will continue to so do within the limits of operation of the spring in forcing the packing 11 to engagement with the cone member and thereby force the same toward the shaft as wear takes place.

It is pointed out, however, that the form of the spring may be varied without departing from the spirit of this invention, the essential feature being the provision of a spring means in conjunction with the washer or apertured plate 12 and a coned wall of the recess in which the packing ring 11 is positioned.

In the form of the invention shown in Fig. 2, the same shaft 3, recess 1 and housing 2 are shown. The form of the outer cup member differs and, as is shown at 14, has a wall parallel with the axis of the shaft, a base 15 seating in the bottom of the recess 1 and further has the coned outer end portion 16. Preferably, I provide a stationary washer 17 lying on the base 15 of the cup member 14 but this may be dispensed with and the base 15 extended toward the shaft to provide a support for the spring washer 18 which lies between such base, or the member 17 as shown, and a washer 19. Between the washer 19 and the coned portion 16 is provided the compressible packing 20 which may be formed of any preferred material. In this construction, Fig. 2, the parts function in the same manner as in the structure shown in Fig. 1, the spring acting to maintain pressure engagement of the packing ring 20 with the surface of the shaft. Preferably, I use a separable washer like part 17 as an auxiliary to the base 15 to provide a sufficiently large aperture 21 to permit the ready introduction of the packing ring 20.

There are many installations, particularly in machine tools and the like, where the quick assembly of the oil seal in the assembled unit form shown in Figs. 1 and 2 with a shaft and housing is not essential and to avoid replacement of the packing ring after the spring has expanded to its normal extent, I provide the construction shown in Fig. 3 which involves a housing 22 having a recess 23 provided with a threaded wall. In the base of this recess is provided the spring ring 24 similar to those previously described which engages a flat washer 25 forcing the packing ring 24 to engagement with a ring member 26 having a tapered face 27. A threaded member 28 is provided for insertion in the threaded recess 23 to engage the ring 26 which by the threading of the member 28 therein compresses the packing and also places the spring 24 under pressure, which spring will thereafter act to maintain pressure up to approximately its limit of expansion whereupon by tightening the member 28 the spring will be again compressed and made to repeatedly function to automatically maintain pressure on the packing ring 29 lying between the coned face 27 and the washer 25.

Thus, in the several forms of the invention shown there is a coned element against which the packing is forced to engagement and caused to feed in toward the shaft as wear takes place by the expansion of a spring element. Thus the principal feature of the invention is involved in either of the forms shown and with the form shown in Figs. 1 and 2 the seal is made up as an assembled unit which may be introduced in position in the housing and in encompassing relation with the cylindrical element.

It is further to be observed by the structure described that the various objects of the invention are attained.

Having thus fully described my invention, its utility and mode of operation, what I claim and desire to secure by Letters Patent of the United States is—

1. In an oil seal for a shaft having a bearing provided with an annular recess about the shaft, a sheet metal cup shaped member tightly fitted into said annular recess and having an aperture in the bottom of larger diameter than the shaft, through which the shaft extends, an annular member secured within the open end of the cup shaped member and provided with a peripheral flange overlying the end face of the bearing, said member also being provided with an annular flange extending toward the shaft at an angle, an annular compressible packing ring positioned between the bottom of the cup shaped member and the angular flange of the annular member and an undulating flat spring positioned between the bottom of the packing ring and the bottom of the cup shaped member, said spring urging the packing ring into engagement with the angular flange of the annular member and into engagement with the periphery of the shaft.

2. In an oil seal, a cup shaped member having an aperture in the bottom for a shaft, an annular member provided with a cylindrical portion fitting tightly within the open end of the cup shaped member, said annular member being provided with a peripheral flange overlying the outer edge of the cup shaped member and an annular flange extending inwardly at an angle from the bottom of said cylindrical portion, an annular packing ring provided with an angular face fitting against the angular flange of the annular member, a flat washer positioned beneath the packing ring and a flat undulating spring between the washer and the bottom of the cup shaped member urging the packing ring into engagement with the angular flange of the annular member.

VICTOR E. NELSON.